(12) United States Patent
Shin et al.

(10) Patent No.: US 6,356,328 B1
(45) Date of Patent: Mar. 12, 2002

(54) LIQUID CRYSTAL DISPLAY

(75) Inventors: Jae Hak Shin; Seung Hee Lee, both of Ich'on (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/198,830

(22) Filed: Nov. 24, 1998

(30) Foreign Application Priority Data

Dec. 3, 1997 (KR) .............................................. 97-65590

(51) Int. Cl.⁷ .............................................. G02F 1/1343
(52) U.S. Cl. ....................................................... 349/141
(58) Field of Search ................................ 349/141, 143, 349/123, 139

(56) References Cited

U.S. PATENT DOCUMENTS

| | | | | |
|---|---|---|---|---|
| 3,936,816 A | * | 2/1976 | Murata | 340/336 |
| 4,431,272 A | * | 2/1984 | Yazawa et al. | 350/336 |
| 4,908,609 A | * | 3/1990 | Stroomer | 340/702 |
| 5,420,708 A | | 5/1995 | Yokoyama et al. | 359/67 |
| 5,552,909 A | | 9/1996 | Onisawa et al. | 359/59 |
| 5,892,562 A | * | 4/1999 | Yamazaki et al. | 349/141 |
| 5,905,556 A | * | 5/1999 | Suzuki et al. | 349/141 |
| 6,233,034 B1 | * | 5/2001 | Lee et al. | 349/141 |

FOREIGN PATENT DOCUMENTS

| | | |
|---|---|---|
| JP | 5-265041 | 10/1993 |
| JP | 6-95135 | 4/1994 |
| JP | 7-72510 | 3/1995 |
| JP | 8-146446 | 6/1996 |
| JP | 8-220568 | 8/1996 |
| JP | 8-278497 | 10/1996 |
| JP | 9-61835 | 3/1997 |
| JP | 9-90352 | 4/1997 |
| JP | 9-269508 | 10/1997 |
| JP | 9-329784 | 12/1997 |
| JP | 10-65234 | 3/1998 |

* cited by examiner

*Primary Examiner*—William L. Sikes
*Assistant Examiner*—Dung Nguyen
(74) *Attorney, Agent, or Firm*—Ladas & Parry

(57) ABSTRACT

In a liquid crystal display having an upper substrate and a lower substrate opposite thereto, a liquid crystal molecules interposed therebetween, a gate bus and data bus line arranged in a first direction and the second direction respectively on the lower substrate, thus defining a space for an unit cell of the liquid crystal display, a channel layer at the intersection of the gate bus line and the data bus line, a counter electrode and a pixel electrode for operating the liquid crystal molecules disposed at unit cell and an insulating layer for isolating the gate bus line from the data bus line, the part of the counter electrode and the part of the pixel electrode by which the electric field parallel to the gate bus line are located in the space for unit cell and has sectional view of a substantial triangle shape. Accordingly, an equipotential area in which liquid crystal molecules do not operate over the counter electrode and the pixel electrode is minimized, thus improving an aperture ratio and a transmittance of the LCD.

20 Claims, 4 Drawing Sheets

LIQUID CRYSTAL DISPLAY

BACKGROUND

The present invention relates to a technique of liquid crystal display(LCD) with a counter electrode and a pixel electrode capable of minimizing an area on which liquid crystal molecules do not operate, thus improving an aperture ratio and a transmittance of the LCD.

In general, an IPS-LCD (In-Plane Switching Liquid Crystal Display), improving a narrow viewing angle of a TN-LCD (Twisted Nematic Liquid Crystal Display) has a counter electrode disposed on a lower substrate on which a pixel electrode is arranged. That is, the electric field of the IPS-LCD is parallel to the upper and lower substrates while in the conventional TN-LCD, there is generated an electric field between the pixel electrode formed on the lower substrate and the counter electrode formed on the upper substrate, perpendicular to the upper and lower substrates.

With reference to FIG. 2, the IPS-LCD is described.

The LCD includes a gate bus line 1 made of opaque metal, for selecting a corresponding unit cell, a data bus line 3 made of opaque metal, a thin film transistor (TFT), a counter electrode 5 and a pixel electrode 6. Generally, the gate line 2, the data line 3, the TFT, the counter electrode 5 and the pixel electrode 6 are formed on a lower substrate 1. The data bus line 3 vertically intersects with the gate bus lines 2 in an uniform distance, thereby forming a space for a LCD unit cell. A channel layer 4 of the TFT is formed at the intersection of the gate bus line 2 and the data bus line 3. The data bus line 3 is overlapped with the channel layer 4 over the channel layer 4 and the gate bus line 2 is overlapped with the channel layer 4 under the channel layer 4. In the space for LCD unit cell, there are provided the counter electrode 5 and the pixel electrode 6. The counter electrode 5 has a wiring part 5a parallel disposed to the gate bus line 2 and at least one branch 5b extended from the wiring part 5a toward the gate bus line 2 with parallel to the data bus line 3. The number of branch 5b in the FIG. 1 is three and a distance between the branches is uniform. The wiring part 5a of the counter electrode 5 is connected to the wiring parts of left and right unit cells and all the counter electrodes receive same signal voltage. The pixel electrode 6 includes a first part 6a, overlapped with the channel layer 4 and serving a drain of the TFT, a second part 6b disposed between the branches 5b of the counter electrode 5 and parallel to the branch 5b and a third part 6c parallel to the gate bus line 2 for connecting the first part 6a and the second part 6b. That is, in the space for unit cell the branch 5b of the counter electrode 5 and the second part 6b of the pixel electrode 6 are alternatively separated by same distance and parallel to the data bus line 3. Between the gate bus line 1 and the data bus line 3 and between the counter electrode 5 and the pixel electrode 6 are interposed a gate insulating layer (not shown). Wherein AP in FIG. 1 designates aperture region of unit pixel.

The problem of the IPS-LCD will be described with reference to FIG. 2 showing a sectional view along II—II' of FIG. 1. The numeral 7 indicates a liquid crystal molecule. When a signal is applied to the branch 5b of the counter electrode 5 and the second part 6b of the pixel electrode 6, there is generated a potential therebetween and thus the liquid crystal molecules are operated. Since the branch 5b of the counter electrode 5 and the second part 6b of the pixel electrode 6 have a given width, there is no electric field thereon. Accordingly, even if the signal is applied, is caused a disclination, the liquid crystal molecules positioned over the branch 5b and the second part 6b being not operated (A solid line represents an equi-potential in FIG. 2). Conventionally, the branch 5b of the counter electrode and the second part 6b of the pixel electrode are made of opaque metal in order to block a light of the area in which the liquid crystal molecules are not operated.

Therefore, the aperture ratio is reduced by the area of the branch 5b and the second part 6b. In detail, the IPS-LCD has an aperture ratio of 40% or less which is lower than that of 50 to 60% in the TN-LCD. The reduction of aperture ration results in the reduction of the transmittance and thus degradation of the brightness of the LCD.

SUMMARY

Accordingly, an aim of a present invention is to provide a LCD having a counter electrode and a pixel electrode capable of minimizing an area in which liquid crystal molecules do not operate.

Another aim of the present invention is to provide a LCD having an improved aperture ratio, a transmittance and brightness.

In order to accomplish the aims of the present invention, in the LCD having a gate bus line disposed in a first direction on a substrate, a data bus line disposed in a second direction on the substrate and defining an unit cell space together with the gate bus lines, a counter electrode comprises a first part formed in the unit cell space, made of transparent material, disposed in the second direction and having a sectional view of a substantial triangle shape. Also, a pixel electrode comprises a second part formed in the unit cell space, made of transparent material, disposed in the second direction and having a sectional view of a substantial triangle shape. There is generated an electric filed parallel to the first direction by the first part and the second part. Here, the sectional view of the first part and the second part is a perfect triangle shape or a trapezoid shape. In case of the trapezoid shape, among four sides of the trapezoid shape, the side opposite to the substrate has a width of about 0.01 to about 2 µm. The first part and the second part are made of ITO. The counter electrode further comprises a wiring part arranged in the first direction spaced from the gate bus line. The wiring part and the first part are electrically connected. The pixel electrode further comprises a third part overlapped with a channel layer formed on the gate bus line and a fourth part for connecting the second part to the third part. Here, the wiring part, the third part and the fourth part are made of opaque metal.

BRIEF DESCRIPTION OF THE ATTACHED DRAWINGS

DESCRIPTION OF THE EMBODIMENT

Figure 1:
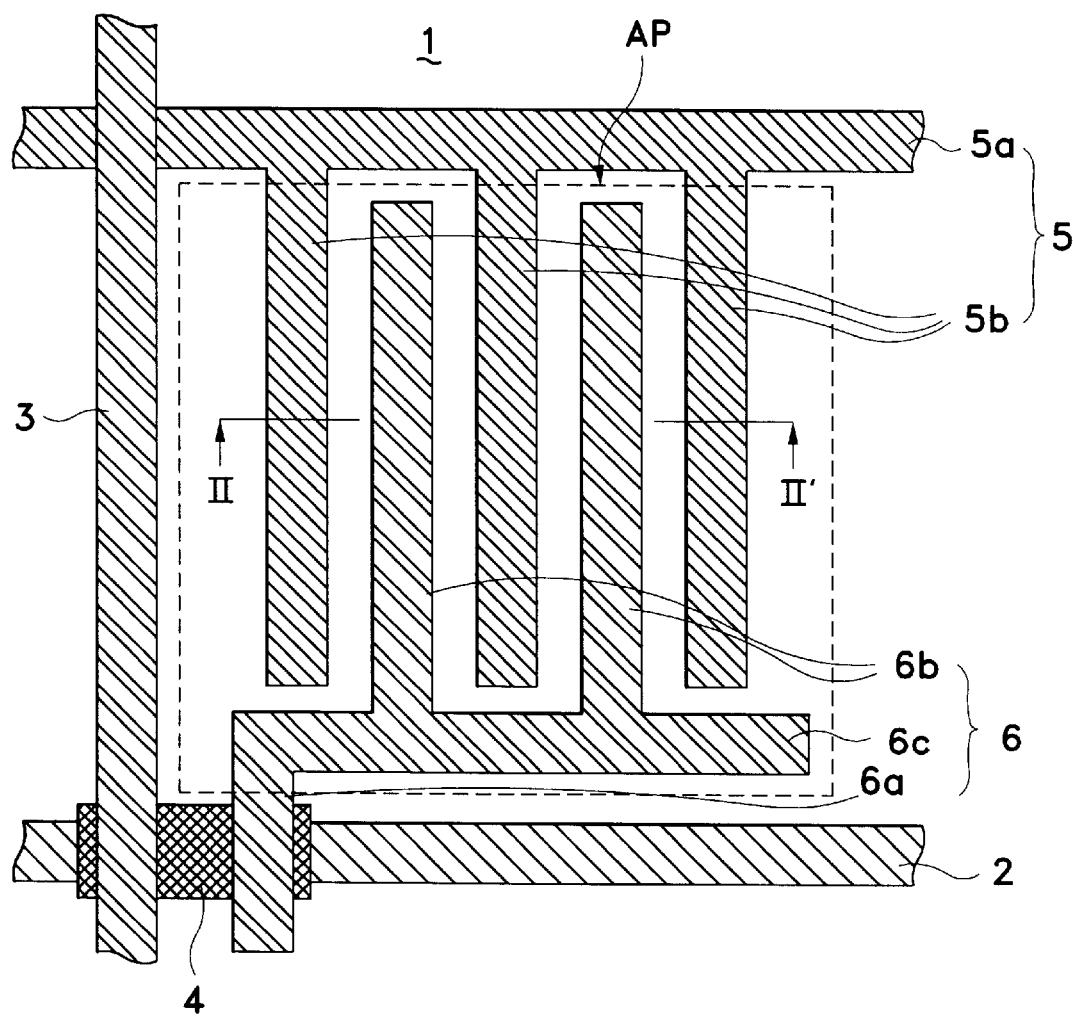
FIG. 1 shows a plane view of the IPS-LCD according to the conventional art.
Figure 3:
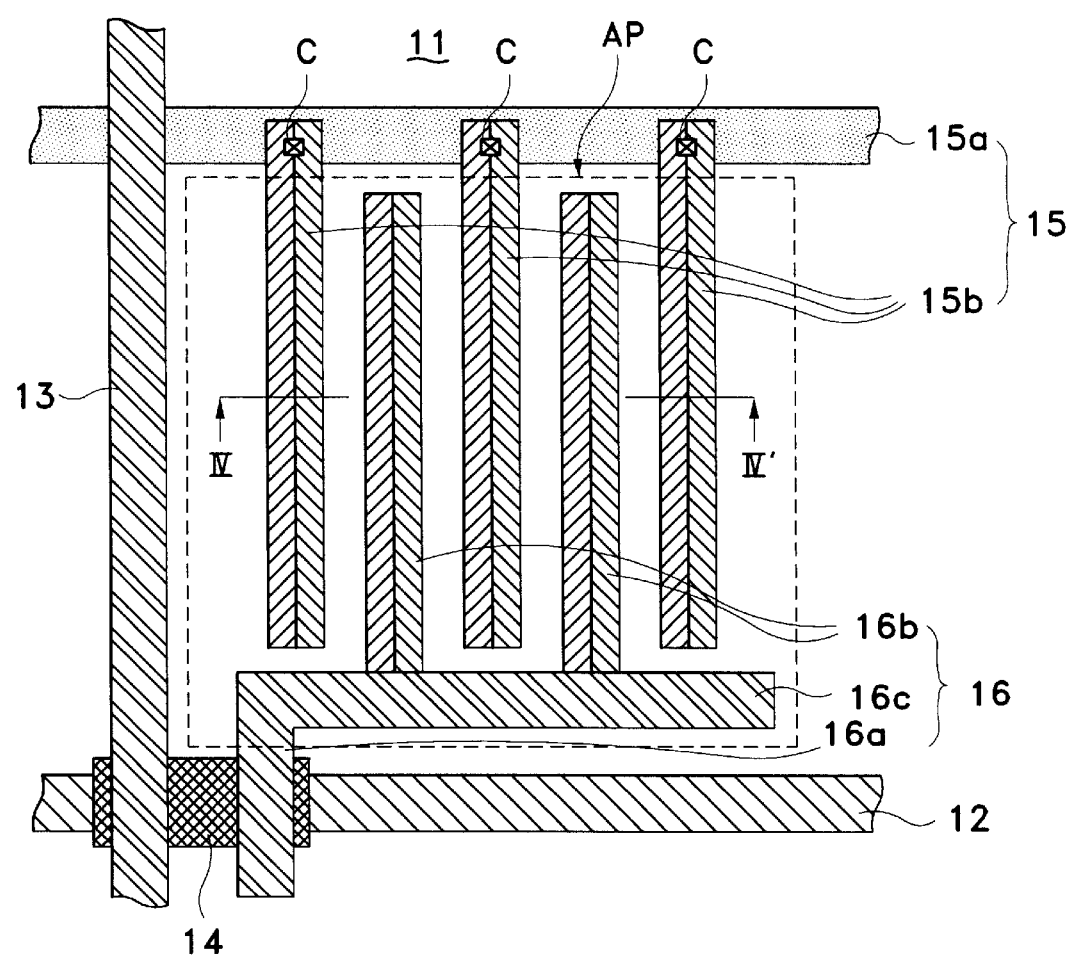
FIG. 3 shows a plane view of the IPS-LCD according to an embodiment of the present invention.

The LCD of FIG. 3 includes a gate bus line 12, a data bus line 13, a TFT, a counter electrode 15 and a pixel electrode 16. The gate bus line 12, the data bus line 13 and a channel layer 14 of the TFT are identical to the gate bus line 2, the data bus line 3 and the channel layer 4 in FIG. 1, so the explanation thereof will be omitted. Also, the gate line 12, the data line 13, the TFT, the counter electrode 15 and the pixel electrode 16 are formed on a lower substrate 11.

In a LCD unit cell space defined by the gate bus line 12 and the data bus line 13, there are provided the counter electrode 15 and the pixel electrode 16. The counter electrode 15 comprises a wiring part 15a made of opaque metal, spaced from the gate bus line 12 and parallel thereto. The wiring part 15a is disposed on the insulating substrate 11 and connected to the wiring part of adjacent unit cell, like the gate bus line 12. The data bus line 13 is electrically isolated from the wiring part 15a by a gate insulating layer. In addition, the counter electrode 15 has at least one branch 15b connected to the wiring part 15a through an insulating layer. The branch 15b is parallel to the data bus line 13 and extended from the wiring part toward the gate bus line 12. In FIG. 3, the number of the branch is three and the same signal is applied to the wiring part and the branch 15b. The branch is uniformly spaced and is made of transparent material, for example ITO, so the aperture ratio of the LCD is improved.

Figure 5:
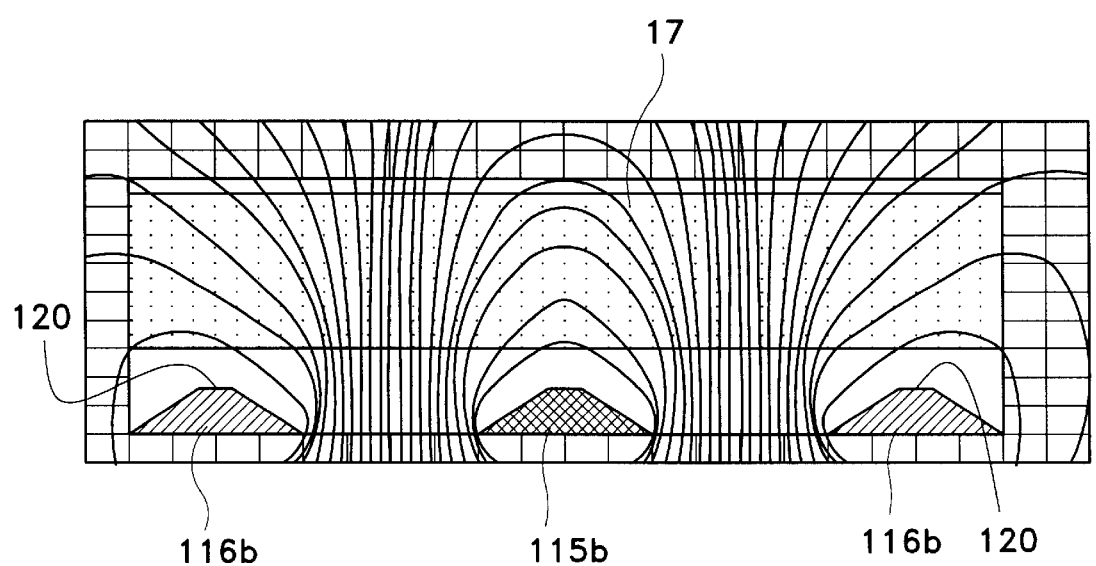
FIG. 5 shows a cross-sectional view having a trapezoid shape.

Also, so as to minimize an equi-potential area on which the liquid crystal molecules do not operate, the sectional view of the branch 15b along IV—IV' is a substantial train angle shape. The "a substantial triangle shape" means a 100% triangle shape or a trapezoid shape, as in FIG. 5, considering the manufacture process. In case of the trapezoid shape, among four sides of the trapezoid shape 115b, 116b (FIG. 5), the side 120 opposite the lower substrate has a width of 0.01 to 2 μm. That is, the equi-potential area generated over the branch of the trapezoid shape 115b, 116b having the side of 0.01 to 2 μm width can be ignored. Wherein C in FIG. 3 designates contact region which contacted the wiring part 15a and the branches 15b.

The pixel electrode 16 has a first part 16a overlapped with one side of the channel layer 14, serving a drain of the TFT. The first part 16a is parallel to the data bus line 13 and made of opaque metal having good conductivity. In addition, the pixel electrode 16 further comprises a second part 16b located between the branches 15b of the counter electrode and parallel to the branch and a third part 16c for electrically connecting the first part 16a and the second part 16b. The second part 16b of the pixel electrode 16 is made of transparent conductive material, for instance ITO in order to increase the aperture ratio of the LCD. Like the branch of the counter electrode, the second part 16b has a sectional view of a substantial triangle shape according to the IV—IV' so as to minimize the equi-potential area thereon. The "a substantial triangle" means a 100% triangle shape or a trapezoid shape considering the manufacture process. In case of the trapezoid shape, amomg four sides of the trapezoid shape the side opposite to the lower substrate has a width of about 0.01 about to 2 μm. That is, can be ignored the equi-potential area generated over the branch having the flat of 0.01 to 2 μm width. The first part to the third part are formed on the gate insulating layer. Wherein AP in FIG. 3 designates aperture region of unit pixel.

Figure 2:
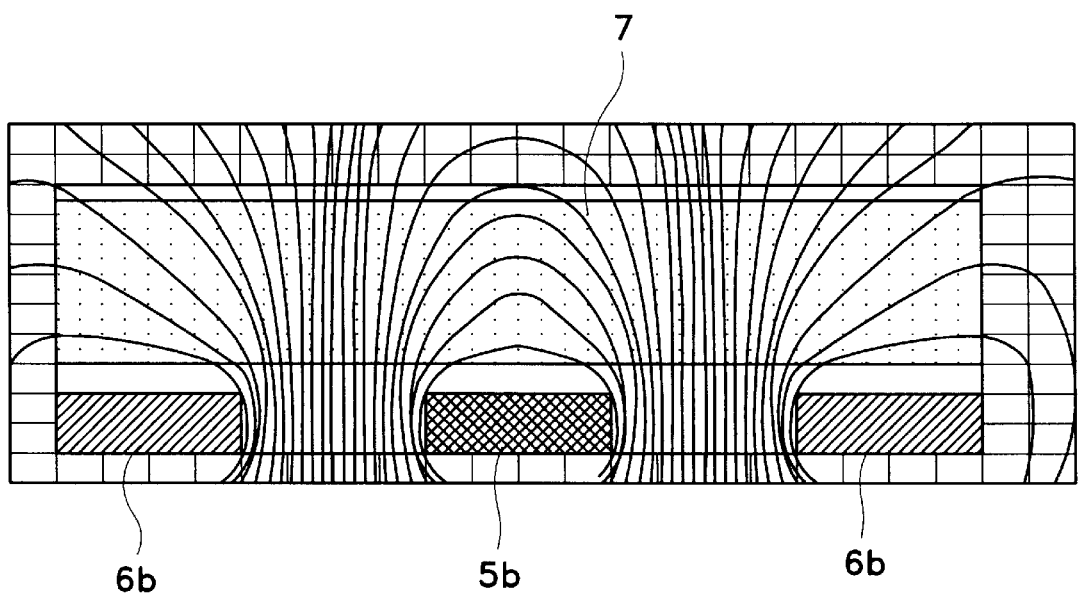
FIG. 2 shows a cross sectional view along II—II' of FIG. 1.
Figure 4:
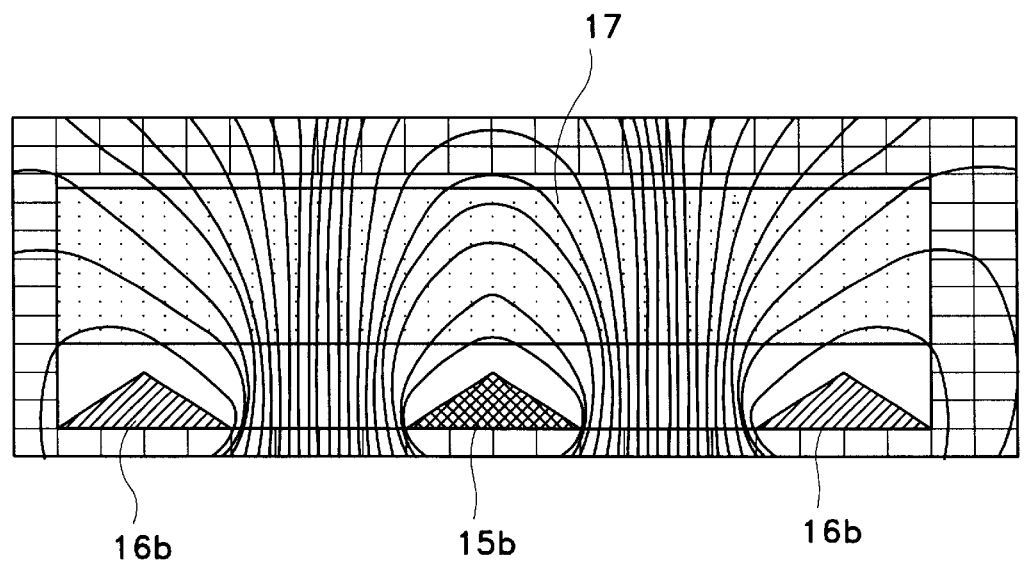
FIG. 4 shows a cross sectional view along IV—IV' of FIG. 3.

FIG. 4 illustrates a sectional view of triangle shape of the branch 15b and the second part 16b. Comparing to the sectional view of FIG. 2, the equi-potential area over the counter electrode and the pixel electrode in FIG. 4 is sufficiently decreased. Since the branch 15b of the counter electrode 15 and the second part 16b of the pixel electrode 16 are made of transparent ITO, comparing to the conventional IPS-LCD the aperture ratio, transmittance and the brightness are enhanced. The wiring part 15a of the counter electrode, the first part 16a of the pixel electrode and the third part 16c of the pixel electrode 16 are all made of opaque metal with good conductivity, so the degradation of the LCD does not happen. The numeral 17 stands for liquid crystal molecules.

As described above, the branch 15b of the counter electrode 15 and the second part 16b of the pixel electrode which are disposed in the aperture region AP of the LCD has a sectional view of a substantial triangle shape and made of transparent conductive material. Accordingly, the equi-potential area on which the liquid crystal molecules do not operate is minimized, and the aperture ratio, the transmittance and the brightness of the LCD are improved.

What is claimed is:

1. A liquid crystal display (LCD) comprising:

a substrate;

a gate bus line arranged in a first direction on the substrate;

a data bus line arranged in a second direction substantially perpendicular to the first direction on the substrate, the data bus line defining a space for an unit cell of the liquid crystal display together with the gate bus line;

a counter electrode having a unitary electrode branch formed in the space for the unit cell of the LCD, made of transparent conductive material and disposed in the second direction, a sectional view of the unitary electrode branch, taken across the complete branch being one of a triangle shape and a trapezoid shape; and a pixel electrode having a first part formed in the space for the unit cell, made of transparent conductive material and disposed in the second direction, a sectional view of the first part being one of a triangle shape and a trapezoid shape, and an electric field parallel to the first direction being generated between the unitary electrode branch and the first part.

2. The LCD according to claim 1, wherein the sectional view of the unitary electrode branch and the first part is a perfect triangle shape.

3. The LCD according to claim 2, wherein the unitary electrode branch and the first part are made of ITO.

4. The LCD according to claim 2, wherein the counter electrode further comprises a wiring part spaced from the gate bus line and disposed in the first direction and the wiring part and the unitary electrode branch are electrically connected.

5. The LCD according to claim 2, wherein the pixel electrode further comprises a second part overlapped with a channel layer formed on the gate bus line and a third part for electrically connecting the first part to the second part.

6. The LCD according to claim 1, wherein the sectional view of the unitary electrode branch and the first part is a trapezoid shape, among four sides of the trapezoid shape, the side opposite to the substrate having a width of about 0.01 to about 2 μm.

7. The LCD according to claim 6, wherein the unitary electrode branch and the first part are made of ITO.

8. The LCD according to claim 6, wherein the counter electrode further comprises a wiring part spaced from the gate bus line and disposed in the first direction and the wiring part and the unitary electrode branch are electrically connected.

9. The LCD according to claim 6, wherein the pixel electrode further comprises a second part overlapped with a channel layer formed on the gate bus line and a third part for electrically connecting the first part to the second part.

10. The LCD according to claim 1, wherein the unitary electrode branch and the first part are made of ITO.

11. The LCD according to claim 1, wherein the counter electrode further comprises a wiring part spaced from the gate bus line and disposed in the first direction and the wiring part and the unitary electrode branch are electrically connected.

12. The LCD according to claim 7, wherein the wiring part is made of opaque metal.

13. The LCD according to claim 1, wherein the pixel electrode further comprises a second part overlapped with a channel layer formed on the gate bus line and a third part for electrically connecting the first part to the second part.

14. The LCD according to claim 13, wherein the second part and the third part are made of opaque metal.

15. A liquid crystal display (LCD) comprising:

an upper substrate and a lower substrate opposite thereto, a liquid crystal molecules interposed there between;

a gate bus line arranged in a first direction on the lower substrate;

a data bus line arranged in a second direction substantially perpendicular to the first direction on the substrate, the data bus line defining a space for an unit cell of the liquid crystal display together with the gate bus line;

a counter electrode having a unitary electrode branch of at least one branch formed in the space for the unit cell of the LCD, made of transparent conductive material and disposed in the second direction, and a wiring part electrically connected to the unitary electrode branch and spaced from the gate bus line, a sectional view of the unitary electrode branch, taken across the complete branch being one of a triangle shape and a trapezoid shape and the wiring part disposed in the first direction; and a pixel electrode having a first part of at least one branch formed in the space for the unit cell, made of transparent conductive material and disposed in the second direction, a second part overlapped with a channel layer formed on the gate bus line and a third part for electrically connecting the first part to the second part, a sectional view of the first part being one of a triangle shape and a trapezoid shape, and an electric field parallel to the first direction being generated between the unitary electrode branch and the second part.

16. The LCD according to claim 15, wherein the sectional view of the unitary electrode branch and the first part is a perfect triangle shape.

17. The LCD according to claim 15, wherein the sectional view of the unitary electrode branch and the first part is a trapezoid shape, among four sides of the trapezoid shape the side opposite to the lower substrate having a width of about 0.01 to about 2 $\mu$m.

18. The LCD according to claim 15, wherein the unitary electrode branch and the first part are made of ITO.

19. The LCD according to claim 15, wherein the number of the branch of the unitary electrode branch and the first part is three.

20. The LCD according to claim 15, wherein the wiring part, the third part and the fourth part are made of opaque metal.

* * * * *